W. W. WHEELER, F. WHEELER & L. F. EATON.
Improvement in Drain-Tile Machines.
No. 133,277.                            Patented Nov. 19, 1872.
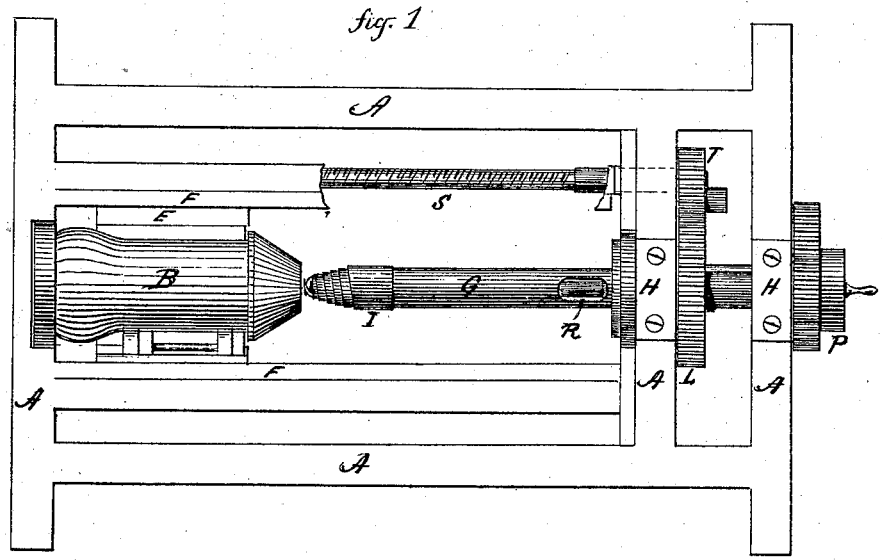
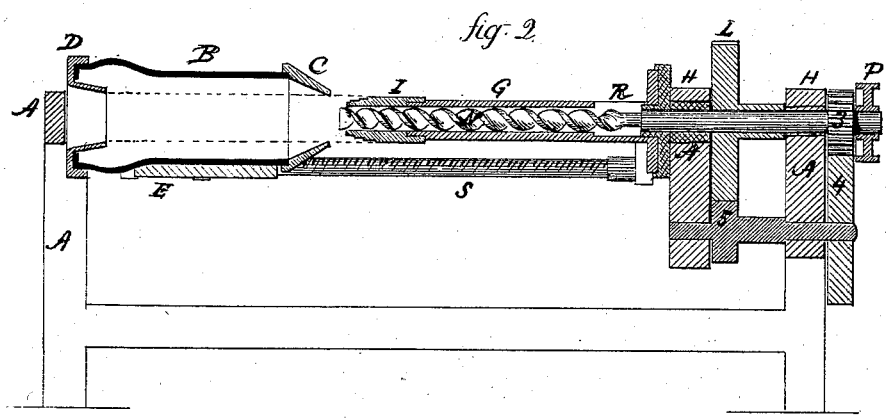

UNITED STATES PATENT OFFICE.

WILLIAM W. WHEELER, FRANK WHEELER, AND L. FRANK EATON, OF WEST MERIDEN, CONNECTICUT.

IMPROVEMENT IN DRAIN-TILE MACHINES.

Specification forming part of Letters Patent No. 133,277, dated November 19, 1872.

*To all whom it may concern:*

Be it known that we, WILLIAM W. WHEELER, FRANK WHEELER, and L. FRANK EATON, of West Meriden, in the county of New Haven and State of Connecticut, have invented a new Improvement in Machine for Making Drain-Tile; and we do hereby declare the following, when taken in connection with the accompanying drawing and the letters of reference marked thereon, to be a full, clear, and exact description of the same, and which said drawing constitutes part of this specification, and represents, in—

Figure 1, a side view, and in Fig. 2 a longitudinal central section.

This invention relates to an improvement in the manufacture of drain-tiles from cement or similar material.

Heretofore it has been the usual plan to place the material into a case around a core, and then "tamp" it to the required degree of hardness.

The object of this invention is to avoid tamping and produce the tiles by mechanical means, whereby a much greater amount of work can be accomplished than by manual labor; and it consists in a boring device combined with a former or mold, the said former or mold being filled with the material from which the tile is to be formed, and resting in a position axially with the boring device, so that the boring device will run through the case, dressing out the center, the end of the boring-tool being formed in a conical spiral shape so as to press and pack the material from the inside.

A is the frame upon which the mechanism is arranged; B, a mold, which is, by preference, formed from metal, and provided at its ends with a heading device, C D, to finish the opposite ends of the tile, so that one will set into the other, and this case or mold is filled with a composition or material from which it is designed to form the tile, and this is laid onto a carriage, E, running longitudinally on suitable guides F. In a line axially with the case we arrange a hollow shaft, G, in bearings H H, and cause it to revolve by means of power applied through a chain of gears, or otherwise, to a wheel, L. Upon the end of the hollow shaft G a head, I, is attached, the diameter of which is the same as the internal diameter of the tile to be produced. The extreme outer end of this head is contracted, forming a spiral shoulder running several times around the head from the largest to the smallest diameter. Within this hollow shaft a boring instrument, N, is arranged so as to revolve freely therein, and caused to revolve at a greater rapidity than the shaft G, power being applied to the spindle of this boring-tool through a pulley, P, and from this pulley communicating power through the wheels 3, 4, and 5 to the gear L. This boring-tool is, by preference, and for the purpose more fully hereinafter described, made in the form of an auger, as seen in Fig. 2. To feed the carriage carrying the case toward the boring-tool, we arrange a leading-screw, S, in connection with the carriage E, and cause it to revolve by the mechanism of the machine here represented as a pinion, T, in connection with the wheel L.

The case being filled and placed in position, then the machine set in motion, the case is carried toward the boring-tool, the auger taking out the center, and, by its spiral form, carrying the material so removed through the shaft G, will discharge it through the opening R in the said hollow shaft; then the head I comes into operation, following the auger, and the spiral shoulder on the end of the head I gradually presses the material from the diameter of the auger back until the largest diameter is attained. This action of the head I compresses and packs the material within the case in the most perfect manner, the case moving on to the boring device until the head I has worked its way the length of the tile; then the case is removed, and the finished tile taken therefrom is refilled again, placed upon the machine for a second operation, and so on.

As the attention of the person attending the machine is not required during the process of boring, it follows that one man will be able to attend several machines, and the boring may be quite as rapid as the ordinary tamping process, which requires the entire time of one, and sometimes two, men at each tile.

We have represented the head I as inclosing the auger, but the head I will perform its work without the auger, provided an opening be first formed through the case, and this may be done by laying a core within the case, and this will be forced out by the head L as the case works onto the head; or the hollow auger-shaft and head may be employed without the auger, having a suitable cutter upon the end of the head to cut away the material, which said material will pass into the hollow shaft, and thence out of the opening R. But we prefer to use the auger as described, as from it we believe the best results may be attained. We represent the case as being moved, but it will be readily understood the same result may be attained by using a stationary case and imparting to the boring device the longitudinal movement.

We claim—

In combination with the case or mold B, the head I, having its extreme end formed into a spiral shoulder, and the auger N revolving within the said head, one or both having a longitudinal movement, substantially as and for the purpose specified.

WILLIAM W. WHEELER.
FRANK WHEELER.
L. FRANK EATON.

Witnesses:
JOHN E. EARLE,
E. A. MERRIMAN.